United States Patent
Zhao et al.

(10) Patent No.: US 12,157,799 B2
(45) Date of Patent: Dec. 3, 2024

(54) SUSTAINABLE TIRE WASTE AEROGEL WITH TUNABLE FLEXIBILITY MADE FROM RECYCLED TIRES FOR AUTOMOTIVE APPLICATIONS

(71) Applicant: Ford Global Technologies, LLC, Dearborn, MI (US)

(72) Inventors: Haibo Zhao, Northville, MI (US); Katherine Avery Vozar, Saline, MI (US); Alper Kiziltas, Sarikamis (TR); Deborah Frances Mielewski, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/539,725

(22) Filed: Dec. 14, 2023

(65) Prior Publication Data

US 2024/0110019 A1 Apr. 4, 2024

Related U.S. Application Data

(62) Division of application No. 17/572,187, filed on Jan. 10, 2022, now abandoned.

(51) Int. Cl.
| | |
|---|---|
| *C08J 3/11* | (2006.01) |
| *C08J 9/00* | (2006.01) |
| *C08J 9/36* | (2006.01) |
| *C08J 11/04* | (2006.01) |
| *D01D 1/02* | (2006.01) |

(Continued)

(52) U.S. Cl.
CPC ............ *C08J 3/11* (2013.01); *C08J 9/0066* (2013.01); *C08J 9/0076* (2013.01); *C08J 9/36* (2013.01); *C08J 11/04* (2013.01); *D01D 1/02* (2013.01); *D01D 5/003* (2013.01); *D01D 10/00* (2013.01);

(Continued)

(58) Field of Classification Search
CPC . C08J 3/11; C08J 9/0066; C08J 9/0076; C08J 9/36; C08J 11/04; D01D 1/02; D01D 5/003; D01D 10/00; D01F 1/02; D01F 6/44
See application file for complete search history.

(56) References Cited

FOREIGN PATENT DOCUMENTS

WO WO-2020236081 A1 * 11/2020 .......... B01J 13/0091
WO WO-2022259044 A1 * 12/2022

OTHER PUBLICATIONS

Thai et al., "Recycling of waste tire fibers into advanced aerogels for thermal insulation and sound absorption applications," Journal of Environmental Chemical Engineering, 8 (2020) 104279, 1-9. (Year: 2020).*

* cited by examiner

Primary Examiner — K. Boyle
(74) Attorney, Agent, or Firm — Burris Law, PLLC

(57) ABSTRACT

A method of manufacturing an elastic polymer aerogel material includes dissolving tire waste in a first portion of a solvent to form a first mixture; dissolving a polymer having at least one double carbon-carbon bond in a second portion of the solvent to form a second mixture; combining the first mixture and the second mixture, wherein the tire waste reacts with the polymer having at least one double carbon-carbon bond to form a reactant gel; and undergoing a solvent exchange on the reactant gel followed by freeze drying the reactant gel to form the elastic polymer aerogel material. The tire waste includes natural rubber, synthetic polymers, (Continued)

steel, and curing systems, and the elastic polymer aerogel material defines a 3D porous structure.

18 Claims, 1 Drawing Sheet

(51) Int. Cl.
*D01D 5/00* (2006.01)
*D01D 10/00* (2006.01)
*D01F 1/02* (2006.01)
*D01F 6/44* (2006.01)

(52) U.S. Cl.
CPC .................. *D01F 1/02* (2013.01); *D01F 6/44* (2013.01); *C08J 2317/00* (2013.01)

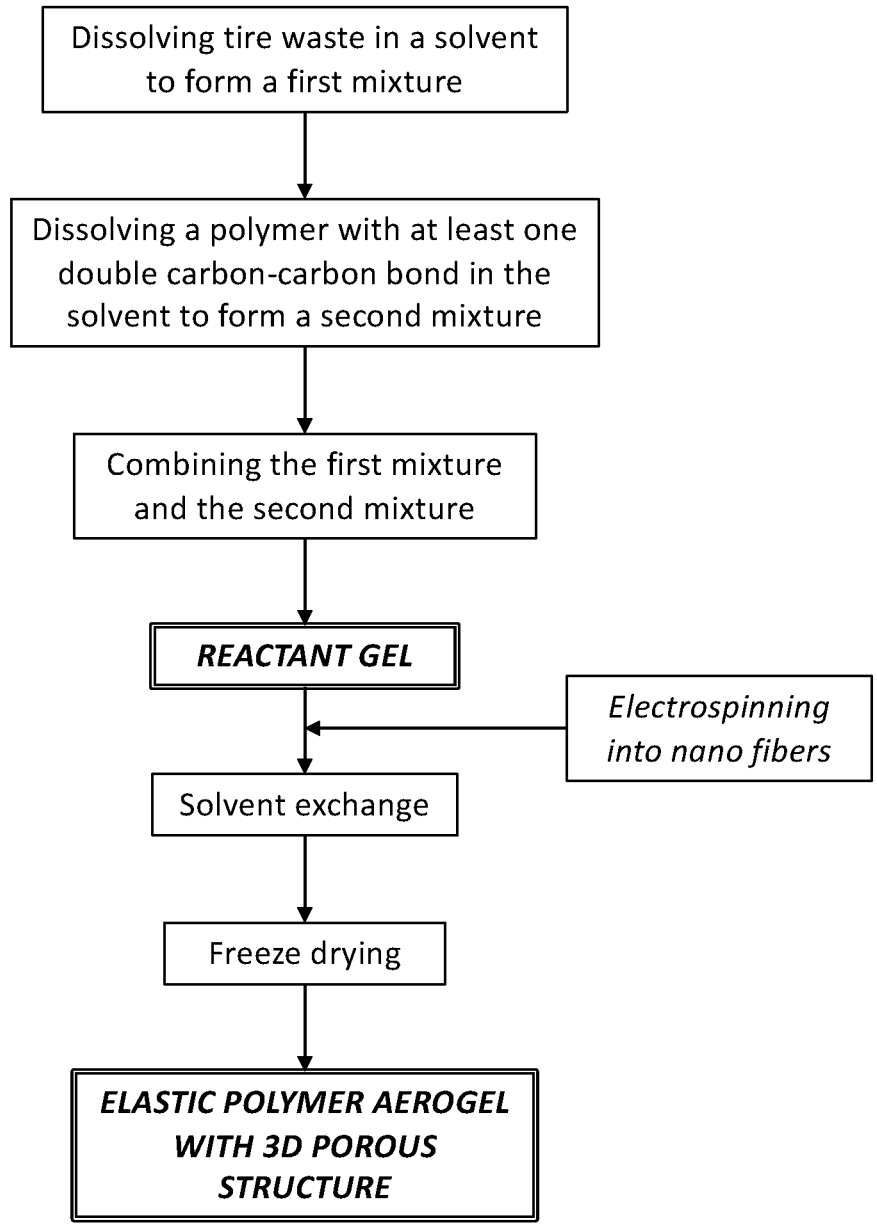

SUSTAINABLE TIRE WASTE AEROGEL WITH TUNABLE FLEXIBILITY MADE FROM RECYCLED TIRES FOR AUTOMOTIVE APPLICATIONS

CROSS-REFERENCE TO RELATED APPLICATION

This application is a divisional application of U.S. Ser. No. 17/572,187, filed on Jan. 10, 2022, and titled "SUSTAINABLE TIRE WASTE AEROGEL WITH TUNABLE FLEXIBILITY MADE FROM RECYCLED TIRES FOR AUTOMOTIVE APPLICATIONS," the content of which is incorporated herein in its entirety.

FIELD

The present disclosure relates to a method of manufacturing an aerogel material, and more particularly to an aerogel material made from recycled tires.

BACKGROUND

The statements in this section merely provide background information related to the present disclosure and may not constitute prior art.

A large amount of tire waste is generated each year, with approximately 300 million tires being disposed of in the United States alone. Current tire recycling methods focus on the recovery of the metal, however recent efforts focus on reuse and/or proper disposal of the rubber compounds, which may include natural rubbers and synthetic polymers.

For example, rubber from discarded tires has been used in pavement bases, artificial turf for sports fields, and tire-derived fuel to power furnaces in cement plants. However, there may still be a negative effect on the environment caused by these methods of reuse, such as the leaching of chemicals from the tires into the ground water and air pollution from inadequately controlled tire incineration.

The present disclosure addresses these and other issues related to the reuse of discarded tires.

SUMMARY

This section provides a general summary of the disclosure and is not a comprehensive disclosure of its full scope or all of its features.

The present disclosure provides a method of manufacturing an elastic polymer aerogel material, the method comprising dissolving tire waste, the tire waste comprising natural rubber, synthetic polymers, steel, and curing systems, in a first portion of a solvent to form a first mixture and dissolving a polymer having at least one double carbon-carbon bond in a second portion of the solvent to form a second mixture. The first mixture and the second mixture are combined, wherein the tire waste reacts with the polymer having at least one double carbon-carbon bond to form a reactant gel. The reactant gel undergoes a solvent exchange followed by freeze drying to form the elastic polymer aerogel material, wherein the elastic polymer aerogel material defines a 3D porous structure. During the freeze drying, air replaces the solvent in the polymer network and forms the 3D porous structure.

In variations of this method, which may be employed individually or in any combination: the reactant gel is spun into nanofibers before undergoing the solvent exchange, a filler material is added into the second mixture to form a filler-reinforced elastic polymer aerogel material, the filler material is nano silicon, the filler material is selected from the group consisting of graphite, carbon black, nanotubes, and nano fibers, the reactant gel comprises disulfide crosslinks generated by oxidation in the combining step, the reactant gel comprises sulfide crosslinks generated by a thiol-ene reaction in the combining step, a degree of polymerization of the reactant gel is controlled to modify a flexural modulus of the 3D porous structure, the 3D porous structure has a porosity greater than 70%, the 3D porous structure has a density between about 0.02 g/cm$^3$ to about 0.30 g/cm$^3$, and the 3D porous structure has a thermal conductivity between about 0.02 W/mK to about 0.10 W/mK.

In another form of the present disclosure, a method of manufacturing an elastic polymer aerogel material includes dissolving tire waste in a first portion of a solvent to form a first mixture; dissolving a polymer having at least one double carbon-carbon bond in a second portion of the solvent to form a second mixture; combining the first mixture and the second mixture, wherein the tire waste reacts with the polymer having at least one double carbon-carbon bond to form a reactant gel; and undergoing a solvent exchange on the reactant gel followed by freeze drying the reactant gel to form the elastic polymer aerogel material. The elastic polymer aerogel material defines a 3D porous structure and, prior to the combining step, the first mixture is prepared and held at about 60° C. for about 48 hours and the second mixture is prepared and held at about 60° C. for about 6 hours.

In variations of this form of the present disclosure, which may be employed individually or in any combination: after the combining step and prior to the solvent exchange, the reactant gel is heated to about 80° C. for about 5 hours; after the combining step and prior to the solvent exchange, the reactant gel is heated using ultraviolet light for about 10 minutes; the solvent comprises one of benzene, dimethylformamide (DMF), and toluene; the reactant gel comprises disulfide crosslinks generated by oxidation in the combining step; a flexural modulus of the 3D porous structure is about 10 MPa at full crosslinking; and a flexural modulus of the 3D porous structure is about 7 MPa at 50% degree of crosslinking.

In a further form of the present disclosure, a part includes the elastic polymer aerogel material formed by a process described previously.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a flow diagram illustrating a method of manufacturing an elastic polymer aerogel material according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In general, tires comprise natural rubber, synthetic polymers, steel, textiles, fillers, and additional antioxidants, antiozonants, and curing systems (sulfur, zinc oxide). Textiles are generally used in passenger/light truck tires but not in truck tires. Accordingly, tire waste as used herein includes at least a plurality of these constituent components of tires, which are recycled and used in the innovative elastic polymer aerogel material according to the teachings of the present disclosure.

Referring to FIG. 1, a method of manufacturing an elastic polymer aerogel material starts with dissolving tire waste in a solvent. As set forth above, the tire waste comprises in one form natural rubber, synthetic polymers, steel, fillers, and curing systems. The solvent may include, by way of example, benzene, dimethylformamide (DMF), or toluene, among others. After the tire waste is dissolved in the solvent, a first mixture is formed. In one exemplary form according to the present disclosure, the first mixture comprises about 10 grams of tire waste, about 1.0 grams of $B(C_6F_5)_3$ Tris (pentafluorophenyl)borane catalyst, and about 500 mL of toluene. The first mixture is prepared and held at about 60 QC for about 48 hours. The first mixture is then filtered to remove any unreacted tire waste.

Next, a polymer having at least one double carbon-carbon bond is dissolved in the same the solvent to form a second mixture. The polymer may include, by way of example, an acrylic hydrocarbon with at least one double carbon-carbon bond or other organic components with at least one double carbon-carbon bond like alkene-containing oils such as unsaturated vegetable oil, among others. In one exemplary form according to the present disclosure, the second mixture comprises about 10 grams of the polymer dissolved in about 500 mL of toluene. The second mixture is prepared and held at about 60 QC for about 6 hours. In this form, the resultant elastic polymer aerogel has a density of greater than or equal to about 0.01 to less than or equal to about 0.02 $g/cm^3$.

The first mixture and the second mixture are then combined, and the tire waste reacts with the polymer having at least one double carbon-carbon bond to form a reactant gel under proper temperature and pressure. In one exemplary form according to the present disclosure, the combined first and second mixtures are heated to about 80 QC for about 5 hours. In another form, the combined first and second mixtures are heated using ultraviolet (UV) light for about 10 minutes. After this reaction, the reactant gel is formed.

After the first and second mixtures are combined, the combined mixtures are taken through a solvent exchange on the reactant gel to form an elastic polymer aerogel material, which defines a 3D porous structure.

In one variation of the present disclosure, the reactant gel is spun into nanofibers before solvent exchange and freeze drying. In one form, the 3D porous structure has a porosity greater than 70%. Further, the 3D porous structure has a density between about 0.02 $g/cm^3$ to about 0.30 $g/cm^3$. In another form, the 3D porous structure has a thermal conductivity between about 0.02 W/mK to about 0.10 W/mK.

In one variation of the present disclosure, a filler material is added to the second mixture to form a filler-reinforced elastic polymer aerogel material. The filler material may include, by way of example, nano silicon particles and the resulting elastic polymer aerogel material can be used as an anode in a high energy density battery application. In one variation of the present disclosure, the nano silicon particle filler material comprises greater than or equal to 70% by weight of the second mixture. In other forms of the present disclosure, the filler material includes nanotubes, nano fibers, graphite, and/or carbon black.

In various forms of the reactant gel, the reactant gel comprises disulfide crosslinks generated by oxidation when the first and second mixtures are combined, and the reactant gel comprises sulfide crosslinks generated by a thiol-ene reaction when the first and second mixtures are combined.

In still another variation of the present disclosure, a degree of polymerization of the reactant gel is controlled to modify a flexural modulus of the 3D porous structure. For example, at full crosslinking, the flexural modulus of the 3D porous structure is about 10 MPa, while at 50% degree of crosslinking, the flexural modulus of the 3D porous structure is about 7 MPa.

A variety of parts for motor vehicles having the innovative elastic polymer aerogel of the present disclosure are contemplated according to the present disclosure. For example, the elastic polymer aerogel could be used in noise-vibration-harshness (NVH) and heat insulating applications such engine covers. It should be understood that the number of applications, including outside of motor vehicles, are numerous and should be construed as falling within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of manufacturing an elastic polymer aerogel material, the method comprising:
   dissolving tire waste, the tire waste comprising natural rubber, synthetic polymers, steel, and curing systems, in a first portion of a solvent to form a first mixture;
   dissolving a polymer having at least one double carbon-carbon bond in a second portion of the solvent to form a second mixture;
   combining the first mixture and the second mixture, wherein the tire waste reacts with the polymer having at least one double carbon-carbon bond to form a reactant gel; and
   undergoing a solvent exchange on the reactant gel followed by freeze drying the reactant gel to form the elastic polymer aerogel material,
   wherein the elastic polymer aerogel material defines a 3D porous structure.

2. The method according to claim 1, wherein the reactant gel is spun into nanofibers before undergoing the solvent exchange.

3. The method according to claim 1, further comprising adding a filler material into the second mixture to form a filler-reinforced elastic polymer aerogel material.

4. The method according to claim 3, wherein the filler material is nano silicon.

5. The method according to claim 3, wherein the filler material is selected from the group consisting of graphite, carbon black, nanotubes, and nano fibers.

6. The method according to claim 1, wherein the reactant gel comprises disulfide crosslinks generated by oxidation in the combining step.

7. The method according to claim 1, wherein the reactant gel comprises sulfide crosslinks generated by a thiol-ene reaction in the combining step.

8. The method according to claim 1, wherein a degree of polymerization of the reactant gel is controlled to modify a flexural modulus of the 3D porous structure.

9. The method according to claim 1, wherein the 3D porous structure has a porosity greater than 70%.

10. The method according to claim 1, wherein the 3D porous structure has a density between about 0.02 g/cm$^3$ to about 0.30 g/cm$^3$.

11. The method according to claim 1, wherein the 3D porous structure has a thermal conductivity between about 0.02 W/mK to about 0.10 W/mK.

12. A method of manufacturing an elastic polymer aerogel material, the method comprising:
   dissolving tire waste in a first portion of a solvent to form a first mixture;
   dissolving a polymer having at least one double carbon-carbon bond in a second portion of the solvent to form a second mixture;
   combining the first mixture and the second mixture, wherein the tire waste reacts with the polymer having at least one double carbon-carbon bond to form a reactant gel; and
   undergoing a solvent exchange on the reactant gel followed by freeze drying the reactant gel to form the elastic polymer aerogel material,
   wherein the elastic polymer aerogel material defines a 3D porous structure, and
   wherein, prior to the combining step, the first mixture is prepared and held at about 60° C. for about 48 hours and the second mixture is prepared and held at about 60° C. for about 6 hours.

13. The method according to claim 12, wherein after the combining step and prior to the solvent exchange, the reactant gel is heated to about 80° C. for about 5 hours.

14. The method according to claim 12, wherein after the combining step and prior to the solvent exchange, the reactant gel is heated using ultraviolet light for about 10 minutes.

15. The method according to claim 12, where the solvent comprises one of benzene, dimethylformamide (DMF), and toluene.

16. The method according to claim 12, wherein the reactant gel comprises disulfide crosslinks generated by oxidation in the combining step.

17. The method according to claim 16, wherein a flexural modulus of the 3D porous structure is about 10 MPa at full crosslinking.

18. The method according to claim 16, wherein a flexural modulus of the 3D porous structure is about 7 MPa at 50% degree of crosslinking.

* * * * *